US012589410B2

(12) United States Patent
Ni et al.

(10) Patent No.: US 12,589,410 B2
(45) Date of Patent: Mar. 31, 2026

(54) FILM FORMING METHOD AND FILM FORMING APPARATUS

(71) Applicant: TOKYO ELECTRON LIMITED, Tokyo (JP)

(72) Inventors: Zeyuan Ni, Nirasaki (JP); Taiki Kato, Nirasaki (JP)

(73) Assignee: TOKYO ELECTRON LIMITED, Tokyo (JP)

(*) Notice: Subject to any disclaimer, the term of this patent is extended or adjusted under 35 U.S.C. 154(b) by 311 days.

(21) Appl. No.: 17/762,363

(22) PCT Filed: Sep. 15, 2020

(86) PCT No.: PCT/JP2020/034981
§ 371 (c)(1),
(2) Date: Mar. 21, 2022

(87) PCT Pub. No.: WO2021/060092
PCT Pub. Date: Apr. 1, 2021

(65) Prior Publication Data

US 2022/0388030 A1 Dec. 8, 2022

(30) Foreign Application Priority Data

Sep. 24, 2019 (JP) ................................ 2019-173418

(51) Int. Cl.
*B05D 1/00* (2006.01)
*B05D 1/32* (2006.01)
(Continued)

(52) U.S. Cl.
CPC ................ *B05D 1/60* (2013.01); *B05D 1/32* (2013.01); *B05D 3/044* (2013.01); *B05D 3/067* (2013.01);
(Continued)

(58) Field of Classification Search
CPC . B05D 1/60; B05D 1/32; B05D 3/044; B05D 3/067; B05D 3/102; B05D 2202/45; B05D 2401/40
See application file for complete search history.

(56) References Cited

U.S. PATENT DOCUMENTS 11,371,136 B2 * 6/2022 Bhuyan .................. C23C 16/04

FOREIGN PATENT DOCUMENTS

JP 2017-222928 A 12/2017

OTHER PUBLICATIONS

Caldwell, Tracey E. et al., "Preadsorbed Oxygen Atoms Affect the Product Distribution and Kinetics of Acetylene Cyclization to Benzene on Pd(111): a Laser-Induced Thermal Desorption/Fourier Transform Mass Spectrometry Study", The Journal of Physical Chemistry B, 1998, 102(3), 562-568.

(Continued)

*Primary Examiner* — Robert S Walters, Jr.
(74) *Attorney, Agent, or Firm* — Nath, Goldberg & Meyer; Jerald L. Meyer; Tanya E. Harkins

(57) ABSTRACT

A film forming method includes preparing a substrate having a first region in which a metal film or an oxide film of the metal film is exposed, and a second region in which an insulating film is exposed, supplying, to the substrate, an organic compound containing, in a head group, a triple bond between carbon atoms represented by Chemical Formula (1) described in the specification, causing the organic compound to be selectively adsorbed in the first region among the first region and the second region, and cleaving the triple bond in the first region and forming a hydrophobic film having a honeycomb structure of carbon atoms through polymerization.

12 Claims, 5 Drawing Sheets

(51) Int. Cl.
*B05D 3/04* (2006.01)
*B05D 3/06* (2006.01)
*B05D 3/10* (2006.01)

(52) U.S. Cl.
CPC .......... *B05D 3/102* (2013.01); *B05D 2202/45* (2013.01); *B05D 2401/40* (2013.01)

(56) References Cited

OTHER PUBLICATIONS

Dylick-Brenzinger, Rainer et al., "Conformational Mobility in 1,4-Bridged Cyclooctanes. 13C NMR Evidence for Facile Chirality Inversion", Journal of the American Chemical Society, 1981, 103(3), 704-706.
Kraft, K. et al., Tetrahedron Letters, No. 44, pp. 4357-4362, 1967, Pergamon Press Ltd., "Photochemische Reaktionen von Aromated mit Konjugierten Dienen", (Statement of relevancy attached).
Dannetun, et al. "Dehydrogenation of Acetylene and Ethylene Studied on Clean and Oxygen Covered Palladium Surfaces"; Surface Science 173 (1986) 148-159; North-Holland, Amsterdam.
Li, et al. "Dominant Kinetic Pathways of Graphene Growth in Chemical Vapor Deposition: The Role of Hydrogen"; The Journal of Physical Chemistry; Nov. 7, 2017.

* cited by examiner

FILM FORMING METHOD AND FILM FORMING APPARATUS

This is a National Phase Application filed under 35 U.S.C. 371 as a national stage of PCT/JP2020/034981, filed Sep. 15, 2020, an application claiming the benefit of Japanese Application No. 2019-173418, filed Sep. 24, 2019, the content of each of which is hereby incorporated by reference in its entirety.

TECHNICAL FIELD

The present disclosure relates to a film forming method and a film forming apparatus.

BACKGROUND

Patent Document 1 discloses a technique of terminating a dielectric surface, among a silicon surface and the dielectric surface, with a hydroxyl group, replacing the hydroxyl group with a hydrophobic functional group, and selectively depositing a metal-containing layer on the silicon surface using the hydrophobic functional group.

PRIOR ART DOCUMENTS

Patent Documents

Patent Document 1: Japanese Laid-Open Patent Publication No. 2017-222928

An aspect of the present disclosure provides a technique capable of selectively forming a hydrophobic film on the metal film surface among the metal film surface and an insulating film surface.

SUMMARY

A film forming method of an aspect of the present disclosure includes: preparing a substrate having a first region in which a metal film or an oxide film of the metal film is exposed, and a second region in which an insulating film is exposed; supplying, to the substrate, an organic compound containing, in a head group, a triple bond between carbon atoms represented by Chemical Formula (1) below; causing the organic compound to be selectively adsorbed in the first region among the first region and the second region; and cleaving the triple bond in the first region and forming a hydrophobic film having a honeycomb structure of carbon atoms through polymerization, $$H—C≡C—R \quad (1)$$

wherein, in Chemical Formula (1), R is a hydrophobic functional group containing 1 or more and 16 or less carbon atoms.

According to an aspect of the present disclosure, a hydrophobic film can be selectively formed on a metal film surface among the metal film surface and an insulating film surface.

DETAILED DESCRIPTION

Figure 1:
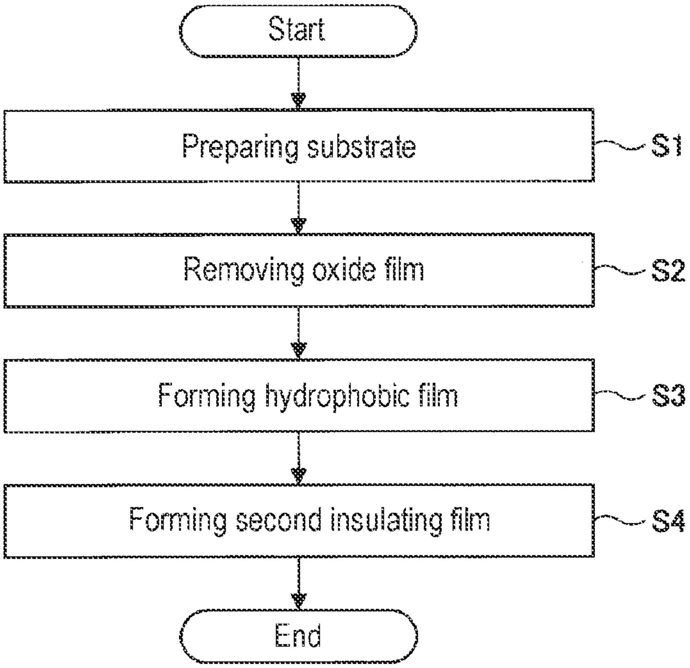
FIG. 1 is a flowchart illustrating a film forming method according to an embodiment.

Hereinafter, embodiments of the present disclosure will be described with reference to the drawings. In each drawing, the same or corresponding components may be denoted by the same reference numerals, and a description thereof may be omitted.

As illustrated in FIG. 1, a film forming method includes, for example, preparing a substrate 10 (S1), removing an oxide film 12 (S2), forming a hydrophobic film 20 (S3), and forming a second insulating film 30 (S4) in this order. As will be described later, the order of these processes is not limited to the order illustrated in FIG. 1. The plurality of processes illustrated in FIG. 1 may be performed at the same time. Some of the plurality of processes illustrated in FIG. 1 may not be performed.

Figure 2A:
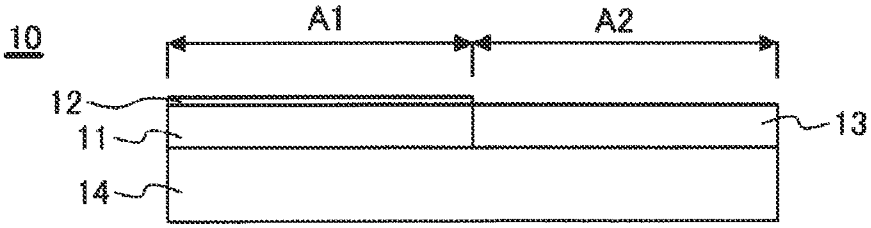
FIG. 2A is a side view illustrating an example of a substrate having an oxide film.

In S1 of FIG. 1, the substrate 10 is prepared as illustrated in FIG. 2A. Preparation of the substrate 10 includes, for example, installing the substrate 10 inside the processing container 120 to be described later. The substrate 10 has a first region A1 in which an oxide film 12 of a metal film 11 is exposed and a second region A2 in which an insulating film 13 is exposed. Since the metal film 11 is usually naturally oxidized in the atmosphere, the metal film 11 is covered with the oxide film 12. The first region A1 and the second region A2 are provided on one side of the substrate 10 in the plate thickness direction.

The number of first regions A1 is one in FIG. 2A, but may be two or more. For example, two first regions A1 may be arranged with a second region A2 interposed therebetween. Similarly, the number of second regions A2 is one in FIG. 2A, but may be two or more. For example, two second regions A2 may be arranged with the first region A1 interposed therebetween.

In addition, only the first region A1 and the second region A2 are present in FIG. 2A, but a third region may be further present. The third region is a region in which a film made of a material different from those of the first region A1 and the second region A2 is exposed. The third region may be arranged between the first region A1 and the second region A2, or may be arranged outside the first region A1 and the second region A2.

The material of the metal film 11 is, for example, a transition metal. The transition metal is, for example, Cu, W, Co, Ru, or Ni.

The material of the insulating film 13 is, for example, a metal compound. The metal compound is aluminum oxide, silicon oxide, silicon nitride, silicon oxynitride, silicon oxycarbide, silicon carbide, or the like. The material of the insulating film 13 may be a low dielectric constant material (Low-k material) having a dielectric constant lower than that of $SiO_2$.

The substrate 10 has a base substrate 14 in addition to the metal film 11 and the insulating film 13. The base substrate 14 is, for example, a semiconductor substrate such as a silicon wafer. In addition, the base substrate 14 may be a glass substrate or the like. The metal film 11 and the insulating film 13 are formed on a surface of the base substrate 14.

The substrate 10 may further include, between the base substrate 14 and the insulating film 13, a base film formed of a material different from those of the base substrate 14 and the insulating film 13. Similarly, the substrate 10 may further include, between the base substrate 14 and the metal film 11, a base film formed of a material different from those of the base substrate 14 and the metal film 11.

Figure 2B:
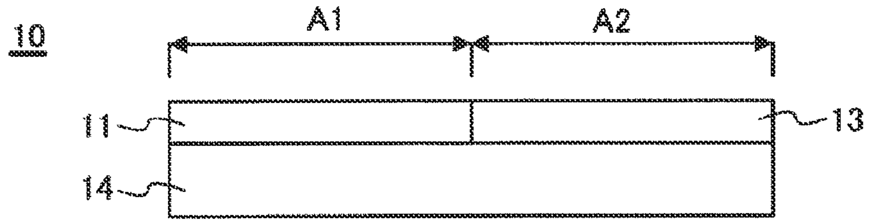
FIG. 2B is a side view illustrating an example of a substrate after removal of the oxide film.

In S2 of FIG. 1, as illustrated in FIG. 2B, the oxide film 12 is removed. By removing the oxide film 12, the metal film 11 is exposed in the first region A1. After the metal film 11 is exposed, a hydrophobic film 20 is formed (S3).

Removal of the oxide film 12 includes, for example, supplying hydrogen ($H_2$) gas to the substrate 10. The hydrogen gas reduces and removes the oxide film 12. The hydrogen gas may be heated to a high temperature in order to promote the chemical reaction. In addition, the hydrogen gas may be plasmatized in order to promote the chemical reaction.

Supply of hydrogen gas is performed, for example, at a temperature of 200 degree C. or higher and 400 degrees C. or lower, and at an atmospheric pressure of 0.5 Torr or higher and 760 Torr or lower, for a time of 2 minutes or longer and 60 minutes or shorter. The hydrogen gas may be diluted with an inert gas such as argon gas, and the concentration of the hydrogen gas may be 10 mass % or more and 100 mass % or less.

The removal of the oxide film 12 is a dry process in the present embodiment, but may be a wet process. For example, the removal of the oxide film 12 may include supplying citric acid to the substrate 10. The substrate 10 may be immersed in citric acid or spin-washed with citric acid.

The process with citric acid is carried out, for example, at a temperature of 25 degrees C. or higher and 60 degrees C. or lower for a time of 10 seconds or longer and 5 minutes or shorter. The citric acid is supplied in the form of an aqueous solution, and the concentration of citric acid may be 0.5 mass % or more and 10 mass % or less.

Although the substrate 10 having the oxide film 12 is prepared in the present embodiment, a substrate 10 having no oxide film 12 may be prepared. In this case, the removal of the oxide film 12 is of course unnecessary. After the metal film 11 is exposed, a hydrophobic film 20 is formed (S3).

Figure 2C:
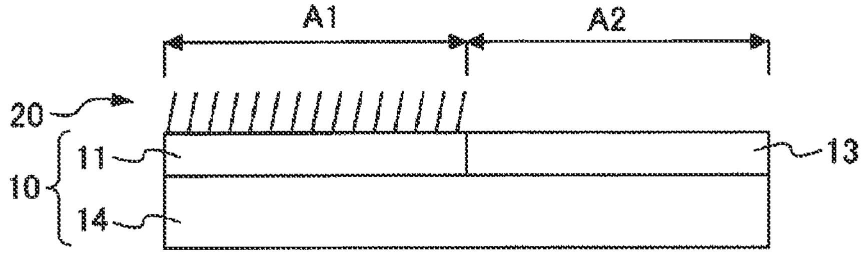
FIG. 2C is a side view illustrating an example of a substrate after formation of a hydrophobic film.

In S3 of FIG. 1, as illustrated in FIG. 2C, the hydrophobic film 20 is selectively formed in the first region A1 among the first region A1 and the second region A2. Specifically, an organic compound containing, in the head group, a triple bond between carbon atoms represented by the following Chemical Formula (1) is supplied to the substrate 10.

$$H{-}C{\equiv}C{-}R \tag{1}$$

In Chemical Formula (1), R is a hydrophobic functional group containing 1 or more and 16 or less carbon atoms. R is an aliphatic hydrocarbon group or an aromatic hydrocarbon group, and may be a functional group in which some of hydrogen atoms are replaced with halogen atoms. The halogen atoms are not particularly limited, but are, for example, fluorine atoms. R is preferably an alkyl group. The longer the linearity of the alkyl group, the higher the hydrophobicity.

The above organic compound contains, in the head group, a triple bond between carbon atoms. The head group has a property of being difficult to be adsorbed on the surface of a substrate having an OH group. The metal film 11 is exposed in the first region A1, while the insulating film 13 is exposed in the second region A2. Generally, the metal film 11 has almost no OH groups on the surface, whereas the insulating film 13 has OH groups on the surface. Therefore, the head group is selectively adsorbed in the first region A1 among the first region A1 and the second region A2. The ease of adsorption is represented by the absolute value $|\Delta E|$ of adsorption energy $\Delta E$.

The adsorption energy $\Delta E$ is obtained from, for example, the equation $\Delta E = Ea - Eb$. Ea is the energy of the organic compound in an adsorbed state in which it is adsorbed on the surface of the substrate, and Eb is the energy of the organic compound in a free state in which it is away from the surface of the substrate.

The adsorption energy $\Delta E$ is obtained by first-principles calculation and is obtained by simulation. The larger the absolute value $|\Delta E|$ of the adsorption energy $\Delta E$, the easier it is for the organic compound to be adsorbed on the substrate surface.

In the present specification. $|\Delta E|$ on the surface of the metal film 11 is referred to as $|\Delta E1|$, and $|\Delta E|$ on the surface of the insulating film 13 is referred to as $|\Delta E2|$. $|\Delta E1|$ is sufficiently larger than $|\Delta E2|$. For example, when R is $C_3H_7$, the material of the metal film 11 is Cu, and the material of the insulating film 13 is either silicon oxide or aluminum oxide, $|\Delta E1-\Delta E2|$ is about 1.1 to 1.3 eV.

Similarly to the above organic compound, a thiol-based compound is also selectively adsorbed in the first region A1 from among the first region A1 and the second region A2. The thiol-based compound has hydrogenated sulfur at the terminal and is represented by the chemical formula "R—SH". In the case of the thiol-based compound, when the material of the metal film 11 is Cu and the material of the insulating film 13 is either silicon oxide or aluminum oxide, $|\Delta E1-\Delta E2|$ is about 1.0 eV.

In the case of the organic compound, when the material of the metal film 11 is Cu and the material of the insulating film 13 is either silicon oxide or aluminum oxide, $|\Delta E1-\Delta E2|$ is about 1.1 eV or more, as described above. Therefore, even compared with the thiol-based compound, the organic compound is excellent in selectivity because it can be selectively adsorbed on the first region A1.

The organic compound is supplied to the substrate 10 as, for example, a gas. The organic compound may be supplied to the substrate 10 as a liquid, and in that case, the organic compound may be supplied to the substrate 10 in a state in which it is dissolved in a solvent.

In S3 of FIG. 1, since the organic compound is adsorbed in the first region A1, as illustrated in FIGS. 3A, 3B, 3C, 3D, and 3E, the triple bond between the carbon atoms of the head group is cleaved and polymerization forms a hydrophobic film 20 having a honeycomb structure of carbon atoms. The triple bond between carbon atoms has a n bond, whereas the honeycomb structure of carbon atoms does not have a n bond. In addition, in FIG. 3A, FIG. 3B, FIG. 3C, FIG. 3D, and FIG. 3E, "Cu/H" means either a Cu atom or an H atom.

The Cu atom of "Cu/H" is the Cu atom of the metal film 11. At least one C atom among a plurality of C atoms in the honeycomb structure may be bonded to a Cu atom of the metal film 11, and the remaining C atoms may be bonded to H atoms. It is sufficient that all C atoms of the honeycomb structure are not bonded to H atoms.

Figure 3A:
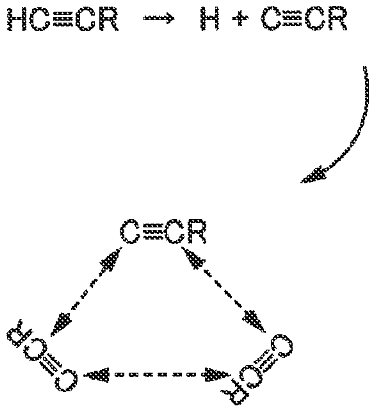
FIG. 3A is a perspective view illustrating an example of a process of forming the hydrophobic film.
Figure 3B:
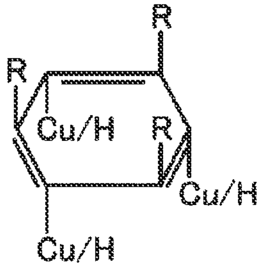
FIG. 3B is a perspective view illustrating an example of the process of forming the hydrophobic film, following FIG. 3A.

First, as illustrated in FIG. 3A, the hydrogen atom at the end of the head group is desorbed, and the molecules of the organic compound polymerize with each other. At this time, as illustrated FIG. 3B, the triple bond between the carbon atoms of the head group is cleaved, and the honeycomb structure of the carbon atoms is formed by the polymerization.

Figure 3C:
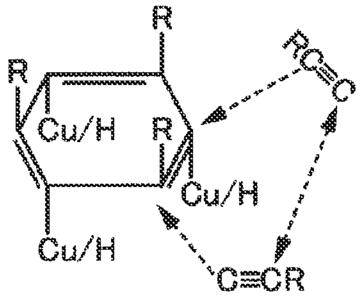
FIG. 3C is a perspective view illustrating an example of the process of forming the hydrophobic film, following FIG. 3B.

Next, as illustrated in FIG. 3C, the polymerization proceeds with the honeycomb structure of carbon atoms formed in advance as the nucleus, and the growth starting from the nucleus starts. Specifically, as illustrated in FIG. 3D, anew honeycomb structure of carbon elements is formed, and the honeycomb structure spreads in the in-plane direction of the substrate 10.

Figure 3D:
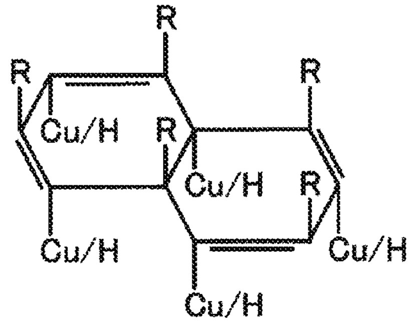
FIG. 3D is a perspective view illustrating an example of the process of forming the hydrophobic film, following FIG. 3C.
Figure 3E:
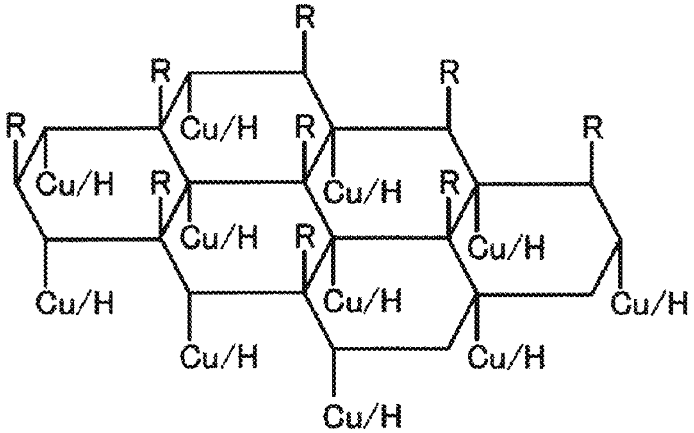
FIG. 3E is a perspective view illustrating an example of the process of forming the hydrophobic film, following FIG. 3D.

The phenomena illustrated in FIGS. 3C and 3D occur repeatedly, and the hydrophobic film 20 illustrated in FIG. 3E is formed over the entire first region A1. The hydrophobic film 20 is a graphane derivative in which some of hydrogen atoms of graphane are replaced with functional groups R.

The functional group R is bonded to every other of six carbon elements arranged in a ring shape, and is bonded to three carbon elements. The orientation of the functional groups R is uniform, and the hydrophobic film 20 is a self-assembled monolayer (SAM).

The functional groups R are bonded to the honeycomb structure of carbon elements, and the honeycomb structure spreads over the entire first region A1. Since the honeycomb structure spreads over the entire first region A1, it is possible to suppress unintended detachment of the hydrophobic film 20 from the first region A1.

The film forming conditions of the hydrophobic film 20 are appropriately determined according to the type of the organic compound, that is, the type of the functional group R. The film formation of the hydrophobic film 20 is carried out, for example, at a temperature of 20 degrees C. or higher and 200 degrees C. or lower, and an atmospheric pressure of 0.1 Torr or higher and 300 Torr or lower.

During the supply of the organic compound, the substrate 10 may be irradiated with light that promotes the polymerization of the molecules of the organic compound. The light to irradiate is, for example, ultraviolet rays or infrared rays. By irradiating with light, nucleation of the honeycomb structure and growth starting from the nucleus can be promoted, and the film formation time of the hydrophobic film 20 can be shortened. Alternatively, irradiation with light enables the film formation of the hydrophobic film 20 at a low temperature.

Further, hydrogen ($H_2$) gas may be supplied while the organic compound is being supplied. By supplying the hydrogen gas, a defect-free honeycomb structure can be obtained over a wide range. It is presumed that the reason is that the supply of hydrogen gas makes the rate of growth starting from the nucleus relatively faster than the rate of nucleation of the honeycomb structure. By supplying hydrogen gas, it is possible to make the honeycomb structure multi-layered. When the oxide film 12 remains in the first region A1, the supply of hydrogen gas can also remove the oxide film 12. In this case, the removal of the oxide film 12 (S2) may be carried out before the supply of the organic compound, but may not be carried out.

Further, acetylene ($C_2H_2$) gas may be supplied during the supply of the organic compound. Similarly to the organic compound, acetylene has triple bonds between carbon atoms. If only acetylene gas is supplied to the substrate 10 instead of the organic compound, graphene is selectively formed in the first region A1 among the first region A1 and the second region A2. Graphene has a honeycomb structure of carbon elements like graphane, but unlike graphane, graphene has no atoms other than carbon elements.

When acetylene gas is supplied during the supply of the gas of the organic compound, the density of functional groups R of the hydrophobic film 20 can be controlled. The density of functional groups R can be controlled by the ratio of the gas flow rate of the organic compound to the gas flow rate of the acetylene gas. The higher the proportion of the acetylene gas, that is, the lower the proportion of the gas of the organic compound, the lower the density of the functional groups R.

Acetylene gas not only has a role of controlling the density of the functional groups R, but also has a role of promoting nucleation of the honeycomb structure of carbon atoms. Therefore, when acetylene gas is supplied, the film formation time of the hydrophobic film 20 can be shortened. It is also possible to form the hydrophobic film 20 at a low temperature.

The acetylene gas may be supplied to the substrate 10 before the supply of the organic compound. Even in this case, the effect of controlling the density of the functional groups R and the effect of promoting the nucleation of the honeycomb structure are obtained. The acetylene gas may be supplied to the substrate 10 after the removal of the oxide film 12.

Figure 2D:
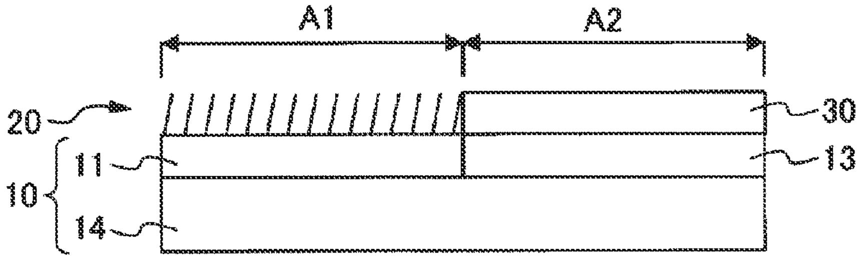
FIG. 2D is a side view illustrating an example of a substrate after film formation of a second insulating film.

In S4 of FIG. 1, as illustrated in FIG. 2D, the hydrophobic film 20 is used to selectively form a second insulating film 30 in the second region A2 among the first region A1 and the second region A2. Since the hydrophobic film 20 inhibits the film formation of the second insulating film 30, the second insulating film 30 is selectively formed in the second region A2.

The second insulating film 30 is formed through, for example, a chemical vapor deposition (CVD) method or an atomic layer deposition (ALD) method. The second insulating film 30 may be laminated on the insulating film 13 originally existing in the second region A2.

The second insulating film 30 is not particularly limited, but is formed of, for example, aluminum oxide. Hereinafter, aluminum oxide is also referred to as "AlO" regardless of the composition ratio of oxygen and aluminum. When the AlO film is formed as the second insulating film 30 through the ALD method, as processing gases, an Al-containing gas, such as trimethylaluminum (TMA:$(CH_3)_3Al$) gas, and an oxidation gas, such as water vapor ($H_2O$ gas), are alternately supplied to the substrate 10. Since water vapor is not adsorbed onto the hydrophobic film 20, AlO selectively deposits in the second region A2. In addition to the Al-containing gas and the oxidizing gas, a reforming gas, such as hydrogen ($H_2$) gas, may be supplied to the substrate 10. These processing gases may be plasmatized to facilitate the chemical reaction. These processing gases may be heated to facilitate the chemical reaction.

The second insulating film 30 may be formed of silicon oxide. Hereinafter, the silicon oxide is also referred to as "SiO" regardless of the composition ratio of oxygen and silicon. When a SiO film is formed as the second insulating film 30 through the ALD method, as processing gases, a Si-containing gas, such as dichlorosilane ($SiH_2Cl_2$) gas, and an oxidizing gas, such as ozone ($O_3$) gas, are alternately supplied to the substrate 10. In addition to the Si-containing gas and the oxidizing gas, a reforming gas, such as hydrogen ($H_2$) gas, may be supplied to the substrate 10. These processing gases may be plasmatized to facilitate the chemical reaction. These processing gases may be heated to facilitate the chemical reaction.

The second insulating film 30 may be formed of silicon nitride. Hereinafter, the silicon nitride is also referred to as "SiN" regardless of the composition ratio of nitrogen and silicon. When a SiN film is formed as the second insulating film 30 through the ALD method, as processing gases, a Si-containing gas, such as dichlorosilane ($SiH_2Cl_2$) gas, and a nitriding gas, such as ammonia ($NH_3$) gas, are alternately supplied to the substrate 10. In addition to the Si-containing gas and the nitriding gas, a reforming gas, such as hydrogen ($H_2$) gas, may be supplied to the substrate 10. These processing gases may be plasmatized to facilitate the chemical reaction. These processing gases may be heated to facilitate the chemical reaction.

Next, with reference to FIG. 4, a substrate processing apparatus that implements the substrate processing method illustrated in FIG. 1 will be described. The film forming apparatus 100 includes a processing unit 110, a transfer apparatus 170, and a controller 180. The processing unit 110 includes a processing container 120, a substrate holder 130, a temperature adjuster 140, a light source 142, a gas supplier 150, and a gas discharger 160.

Figure 4:
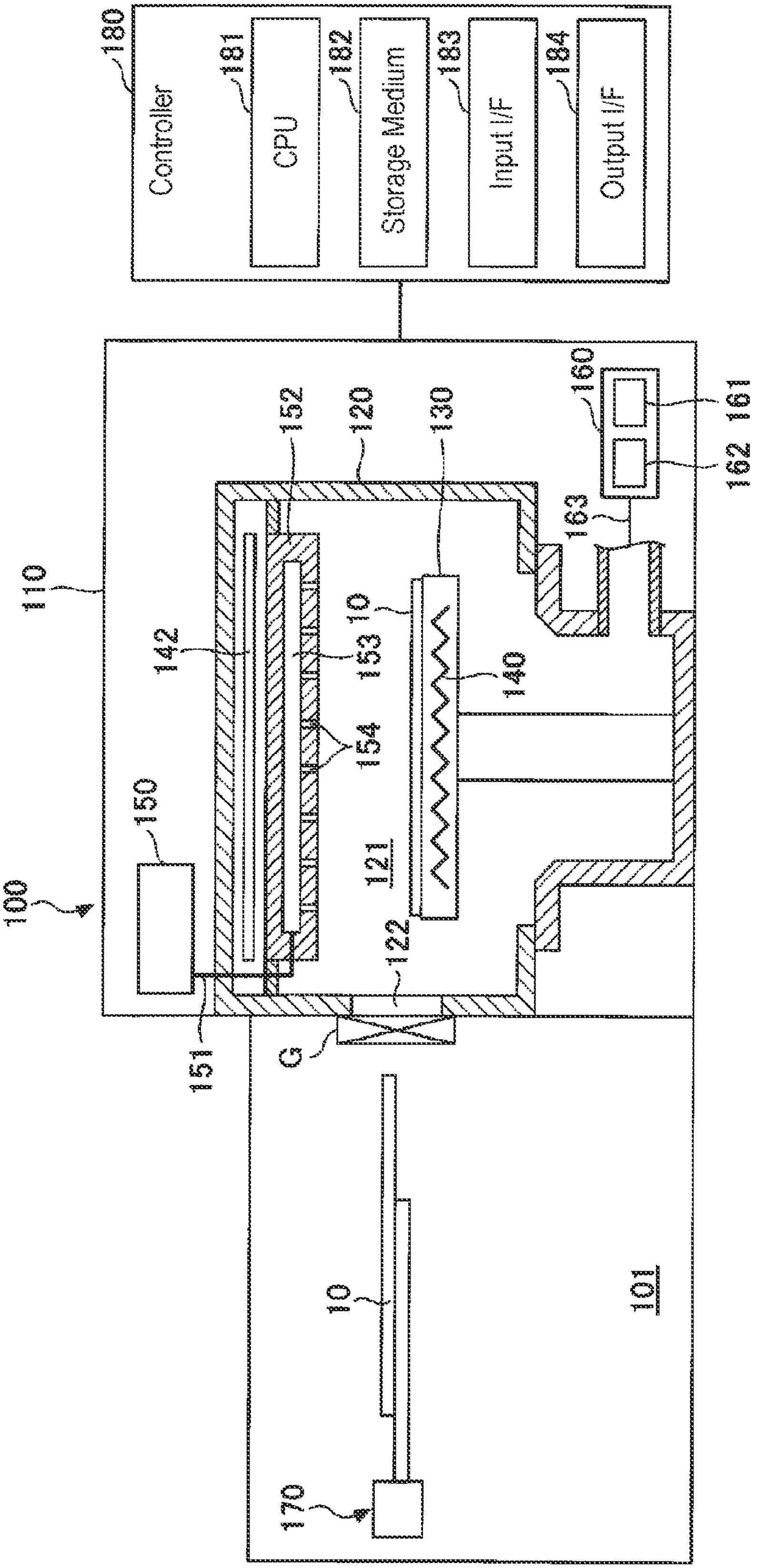
FIG. 4 is a cross-sectional view illustrating an example of a film forming apparatus that implements the film forming method of FIG. 1.

Although only one processing unit 110 is illustrated in FIG. 4, a plurality of processing units 110 may be provided. The plurality of processing units 110 form a so-called multi-chamber system. The plurality of processing units 110 are arranged to surround a vacuum transfer chamber 101. The vacuum transfer chamber 101 is evacuated by a vacuum pump to be maintained at a preset degree of vacuum. In the vacuum transfer chamber 101, the transfer apparatus 170 is disposed to be movable in the vertical direction and the horizontal direction and to be rotatable around the vertical axis. The transfer apparatus 170 transfers a substrate 10 to a plurality of processing containers 120. The processing chamber 121 inside the processing container 120 and the vacuum transfer chamber 101 communicate with each other when the gas pressures thereof are both lower than the atmospheric pressure, and carry-out/in of the substrate 10 is performed. When it is desired to suppress the gas component remaining in the processing chamber 121 from being carried into the vacuum transfer chamber 101 at the time of carry-in/out of the substrate 10, a trace amount of the inert gas may be supplied to the vacuum transfer chamber 101 such that the gas pressure in the vacuum transfer chamber 101 is slightly higher than the gas pressure in the processing chamber 121.

The processing container 120 has a carry-in/out port 122 through which the substrate 10 passes. The carry-in/out port 122 is provided with a gate G that opens/closes the carry-in/out port 122. The gate G basically closes the carry-in/out port 122, and opens the carry-in/out port 122 when the substrate 10 passes through the carry-in/out port 122. When the carry-in/out port 122 is opened, the processing chamber 121 inside the processing container 120 and the vacuum transfer chamber 101 communicate with each other. Before opening the carry-in/out port 122, the processing chamber 121 and the vacuum transfer chamber 101 are both evacuated by a vacuum pump and maintained at a preset pressure.

The substrate holder 130 holds the substrate 10 inside the processing container 120. The substrate holder 130 holds the substrate 10 horizontally from below with the surface of the substrate 10 exposed to the processing gas facing upwards. The substrate holder 130 is a single-wafer type and holds one substrate 10. The substrate holder 130 may be a batch type, or may hold a plurality of substrates 10 at the same time. The batch-type substrate holder 130 may hold a plurality of substrates 10 at intervals in the vertical direction or at intervals in the horizontal direction.

The temperature adjuster 140 adjusts the temperature of the substrate 10 held by the substrate holder 130. For example, the temperature adjuster 140 is an electric heater that heats the substrate holder 130, and generates heat by being supplied with electric power. The electric heater is embedded in, for example, the substrate holder 130 and heats the substrate holder 130 to heat the substrate 10 to a desired temperature. The temperature adjuster 140 may include a lamp configured to heat the substrate holder 130 through a quartz window. In this case, an inert gas, such as argon gas, may be supplied to a space between the substrate holder 130 and the quartz window in order to prevent the quartz window from becoming opaque due to deposits. The temperature adjuster 140 may be installed outside the processing container 120, and the temperature of the substrate 10 may be adjusted from the exterior of the processing container 120.

The light source 142 irradiates the substrate 10 with light that promotes the polymerization of the molecules of the organic compound while the organic compound is being supplied to the substrate 10. The light to irradiate is, for example, ultraviolet rays or infrared rays. The light source 142 is arranged to face the substrate holder 130. The light sources 142 may be rod-shaped, and in that case, a plurality of light sources 142 are arranged such that the entire top surface of the substrate 10 can be uniformly irradiated with light. The light source 142 is installed above, for example, the shower head 152, and irradiates the substrate 10 with light via the shower head 152. In this case, the shower head 152 is made of a material that transmits light, for example, quartz glass or the like. The film forming apparatus 100 may have a light source 142 in a processing unit different from the processing unit 110, and the transfer apparatus 170 may transfer the substrate 10 between the processing unit having the light source 142 and the processing unit 110. When polymerization between molecules proceeds sufficiently without irradiation with light, the film forming apparatus 100 does not have to have the light source 142.

The gas supplier 150 supplies a preset processing gas to the substrate 10. The processing gas is prepared for each process illustrated in FIG. 1 (e.g., S2, S3, and S4 above). S2, S3, and S4 may be carried out inside different processing containers 120, respectively, or any combinations of two or more processes may be continuously carried out inside the same processing container 120. In the latter case, the gas supplier 150 supplies a plurality of types of processing gases to the substrate 10 in a preset order according to the order of the processes.

The gas supplier 150 is connected to the processing container 120 via, for example, a gas supply pipe 151. The gas supplier 150 includes processing gas sources, individual pipes individually extending from respective sources to the gas supply pipe 151, an opening/closing valve provided in the middle of each of the individual pipes, and a flow rate controller provided in the middle of each of the individual pipes. When the opening/closing valve opens the corresponding individual pipe, the corresponding processing gas is supplied from the source thereof to the gas supply pipe 151. The supply amount of the processing gas is controlled by the flow rate controller. Meanwhile, when the opening/closing valve closes the corresponding individual pipe, the supply of the corresponding processing gas from the source thereof to the gas supply pipe 151 is stopped.

The gas supply pipe 151 supplies the processing gas supplied from the gas supplier 150 to the inside of the processing container 120. The gas supply pipe 151 supplies the processing gas supplied from the gas supplier 150 to, for example, the shower head 152.

The shower head 152 is provided above the substrate holder 130. The shower head 152 has a space 153 therein, and ejects the processing gas stored in the space 153 vertically downward from a large number of gas ejection holes 154. A shower-like processing gas is supplied to the substrate 10.

The gas discharger 160 discharges gas from the interior of the processing container 120. The gas discharger 160 is connected to the processing container 120 via an exhaust pipe 163. The gas discharger 160 includes an exhaust source 161, such as a vacuum pump, and a pressure controller 162. When the exhaust source 161 is operated, gas is discharged from the interior of the processing container 120. The gas pressure inside the processing container 120 is controlled by the pressure controller 162. The pressure controller 162 controls the gas pressure inside the processing container 120, for example, by controlling the opening degree of the valve. The larger the opening degree of the valve, the lower the gas pressure inside the processing container 120.

The controller 180 is configured with, for example, a computer, and includes a central processing unit (CPU) 181 and a storage medium 182, such as a memory. The storage medium 182 stores a program for controlling various processes executed in the film forming apparatus 100. The controller 180 controls the operation of the film formation apparatus 100 by causing the CPU 181 to execute the program stored in the storage medium 182. The controller 180 includes an input interface 183 and an output interface 184. The controller 180 receives a signal from the exterior using the input interface 183 and transmits a signal to the exterior using the output interface 184.

The controller 180 controls the gas supplier 150, the gas discharger 160, and the transfer apparatus 170 to carry out the film forming method illustrated in FIG. 1. The controller 180 also controls the temperature adjuster 140 and the light source 142.

All of the processes S2, S3, and S4 illustrated in FIG. 1 may not be carried out inside the same processing container 120, or may be carried out inside different processing containers 120. Alternatively, only two processes (e.g., S2 and S3) may be carried out inside the same processing container 120.

Although the embodiments of the film forming method and the film forming apparatus according to the present disclosure have been described above, the present disclosure is not limited to the above-described embodiments or the like. Various changes, modifications, substitutions, additions, deletions, and combinations can be made within the scope of the claims. Of course, these also fall within the technical scope of the present disclosure.

This application claims priority based on Japanese Patent Application No. 2019-173418 filed with the Japan Patent Office on Sep. 24, 2019, and the entire disclosure of Japanese Patent Application No. 2019-173418 is incorporated herein in its entirety by reference.

EXPLANATION OF REFERENCE NUMERALS

10: substrate, 11: metal film, 12: oxide film, 13: insulating film, 14: base substrate, 20: hydrophobic film, 30: second insulating film, 100: film forming apparatus. 120: processing container, 130: substrate holder, 150: gas supplier, 160: gas discharger, 170: transfer apparatus, 180: controller

What is claimed is:

1. A film forming method comprising:

preparing a substrate having a first region in which a metal film or an oxide film of the metal film is exposed, and a second region in which an insulating film is exposed;

supplying, to the substrate, an organic compound containing, in a head group, a triple bond between carbon atoms represented by Chemical Formula (1) below, while irradiating the substrate with light;

causing the organic compound to be selectively adsorbed in the first region among the first region and the second region; and cyclotrimerizing the organic compounds with the light to form a hydrophobic film having a honeycomb structure of carbon atoms in the first region, $$H—C{\equiv}C—R \tag{1}$$

wherein, in Chemical Formula (1), R is a hydrophobic functional group containing 1 or more and 16 or less carbon atoms.

2. The film forming method of claim 1, further comprising:

removing the oxide film exposed in the first region before the supplying the organic compound to the substrate.

3. The film forming method of claim 2, further comprising:

supplying hydrogen ($H_2$) gas to the substrate before or during the supplying the organic compound to the substrate.

4. The film forming method of claim 3, further comprising:

supplying an acetylene ($C_2H_2$) gas to the substrate before or during the supplying the organic compound to the substrate.

5. The film forming method of claim 4, wherein the metal film is a copper film.

6. The film forming method of claim 5, wherein the insulating film is an aluminum oxide film.

7. The film forming method of claim 6, further comprising:

selectively forming a second insulating film in the second region among the first region and the second region using the hydrophobic film to inhibit formation of the second insulating film in the first region.

8. The film forming method of claim 1, further comprising:

supplying hydrogen ($H_2$) gas to the substrate before or during the supplying the organic compound to the substrate.

9. The film forming method of claim 1, further comprising:

supplying an acetylene ($C_2H_2$) gas to the substrate before or during the supplying the organic compound to the substrate.

10. The film forming method of claim 1, wherein the metal film is a copper film.

11. The film forming method of claim 1, wherein the insulating film is an aluminum oxide film.

12. The film forming method of claim 1, further comprising:

selectively forming a second insulating film in the second region among the first region and the second region using the hydrophobic film to inhibit formation of the second insulating film in the first region.

* * * * *